(12) United States Patent
Castelli

(10) Patent No.: US 7,117,224 B2
(45) Date of Patent: Oct. 3, 2006

(54) METHOD AND DEVICE FOR CATALOGING AND SEARCHING FOR INFORMATION

(76) Inventor: Clino Trini Castelli, Via Tivoli, 8-20121, Milan (IT)

( * ) Notice: Subject to any disclaimer, the term of this patent is extended or adjusted under 35 U.S.C. 154(b) by 282 days.

(21) Appl. No.: 10/181,213

(22) PCT Filed: Jan. 23, 2001

(86) PCT No.: PCT/EP01/00716

§ 371 (c)(1),
(2), (4) Date: Jul. 15, 2002

(87) PCT Pub. No.: WO01/055903

PCT Pub. Date: Aug. 1, 2002

(65) Prior Publication Data

US 2003/0023585 A1    Jan. 30, 2003

(30) Foreign Application Priority Data

Jan. 26, 2000 (IT) .................. MI2000A0098

(51) Int. Cl.
*G06F 17/30* (2006.01)
(52) U.S. Cl. ............... 707/102; 715/526
(58) Field of Classification Search ......... 707/5, 707/102; 715/526
See application file for complete search history.

(56) References Cited

U.S. PATENT DOCUMENTS

| | | | |
|---|---|---|---|
| 5,812,134 A | | 9/1998 | Pooser et al. |
| 5,987,415 A | * | 11/1999 | Breese et al. ............... 704/270 |
| 6,389,415 B1 | * | 5/2002 | Chase ........................... 707/5 |
| 6,556,198 B1 | * | 4/2003 | Nishikawa .................. 345/420 |

FOREIGN PATENT DOCUMENTS

EP    A-0 726 534    8/1996

OTHER PUBLICATIONS

Isomoto Y et al: "Color, Shape and Impression Keyword as Attributes of Paintings for Information Retrieval" 1999 IEEE International Conference on Systems Man and Cybernetics. SMC '99. Human Communication and Cybernetics. Tokyo, Japan, Oct. 12-15, 1999, IEEE International Conference on Systems, Man, and Cybernetics, New York, NY: IEEE, US, vol. 6 of 6, Oct. 12, 1999, pp. 257-262, XP000895773 ISBN: 0-7803-5732-9 the whole document.

* cited by examiner

*Primary Examiner*—Frantz Coby
*Assistant Examiner*—CamLinh Nguyen
(74) *Attorney, Agent, or Firm*—Modiano & Associati; Albert Josif; Daniel J. O'Byrne

(57) ABSTRACT

A method and a device which provide a concise form for cataloging, finding and filtering stored data, being based also on the notation of emotional traits expressed by the data contained in an archive on which the user works. The emotional traits are displayed analogically and topologically by means of a visualization device.

14 Claims, 5 Drawing Sheets

METHOD AND DEVICE FOR CATALOGING AND SEARCHING FOR INFORMATION

BACKGROUND OF THE INVENTION

The present invention relates to a method and a device for cataloging and searching for information in a generic data archive, with particular reference s to archives containing photographic data, catalogs, videos and images in general.

The data banks of companies operating in the visual sector, including in particular the data banks of photo agencies, are currently constituted by such a vast amount of information as to be almost entirely unmanageable with conventional means. For the success of such a company, therefore, it is crucially important not only to offer quality images but also to be able to give assurance to its customers and users in general that they can have rapid and targeted access to its archives. It is in fact known that with the explosive growth of data banks in terms of numbers and size, in recent years a problem has become evident and critical, i.e., the severe difficulty in effectively interpreting the requests of the customer and in directing him toward the information in which he is really interested.

Recently it has been possible to improve and speed up the management and searching of information archives, allowing rapid querying of electronic data banks by means of appropriate interfacing devices. In particular, by way of the diffusion and increase in performance and capacity of electronic computers it has been possible to provide users or customers with electronic archives on magnetic or optical recording media, such as CD-ROMs, and allow the querying of remote archives which can be accessed via computer networks such as for example the Internet. Although archive and cataloging media have improved, searches are still conducted by entering in masks a specific series of data, such as the field considered, the illustrated subject and the author; such data are unable to effectively express the mental idea of the user. The current state of the art is constituted by interfaces which allow, once a certain information item, for example an image, has been identified, to conduct a new targeted search toward other similar images. The results of such searches, however, are often scarcely predictable, since they generate even considerable conceptual differences with respect to the initial idea, indeed due to the lack of a cataloging method which is sufficiently close to the mentality of the user and is capable of corresponding to his emotional language. Conventional methods and devices for archiving and cataloging in fact do not allow to qualify an image according to characteristics which can be easily associated with the user's mental idea; the user is therefore forced to conduct a long and tiring work of visualizing information outside of his actual scope of interest before being able to obtain any information which at long last meets his requirements.

SUMMARY OF THE INVENTION

The aim of the present invention is to solve the above-described problems by introducing a cataloging method and device which are based on emotional identities that the user wishes to be present in the information, for example an image, which is the subject of the search, in order to provide a new concise form of cataloging and retrieval of archived data which is also based on the notation of the emotional traits expressed by the data contained in the archive on which the user is working.

Within this aim, an object of the present invention is to define emotional parameters which are capable of summarizing in concrete terms the abstract idea of the user of a data archive, allowing effective cataloging of the data and rapid searching for information.

Another object of the present invention is to allow the user to easily place emotional identities within the defined parameters and their interpolations, arranging the emotional identities on an architecture which visualizes in an analogical format the relations between them and finally converts the linguistically defined terms into numeric values.

This aim and these and other objects which will become better apparent hereinafter are achieved by a device for cataloging and searching for information, comprising a data archive, a set of cataloging parameters and a device for visualizing said parameters, characterized in that each one of said parameters defines a different emotional identity, in that each data item of said archive is associated with at least one of said parameters, and in that said visualization device visualizes said parameters in an analogical and topological manner.

Advantageously, said emotional identities are constituted by an even number of primary parameters and by a number of secondary parameters which are generated by interpolation from said primary parameters.

Conveniently, said visualization device is a regular polyhedron whose number of vertices can be changed according to the number of primary parameters and secondary parameters being used.

Advantageously, said polyhedron comprises a plurality of superimposed thematic layers, each layer being identified with a different cataloging type or class.

Conveniently, each vertex of the visualization polyhedron is associable with at least one different numeric value to be used as a link to the data archive.

BRIEF DESCRIPTION OF THE DRAWINGS

Further characteristics and advantages of the present invention will become better apparent from the following detailed description, illustrated only by way of non-limitative example in the accompanying figures, wherein.

DESCRIPTION OF THE PREFERRED EMBODIMENTS

Figure 1A:
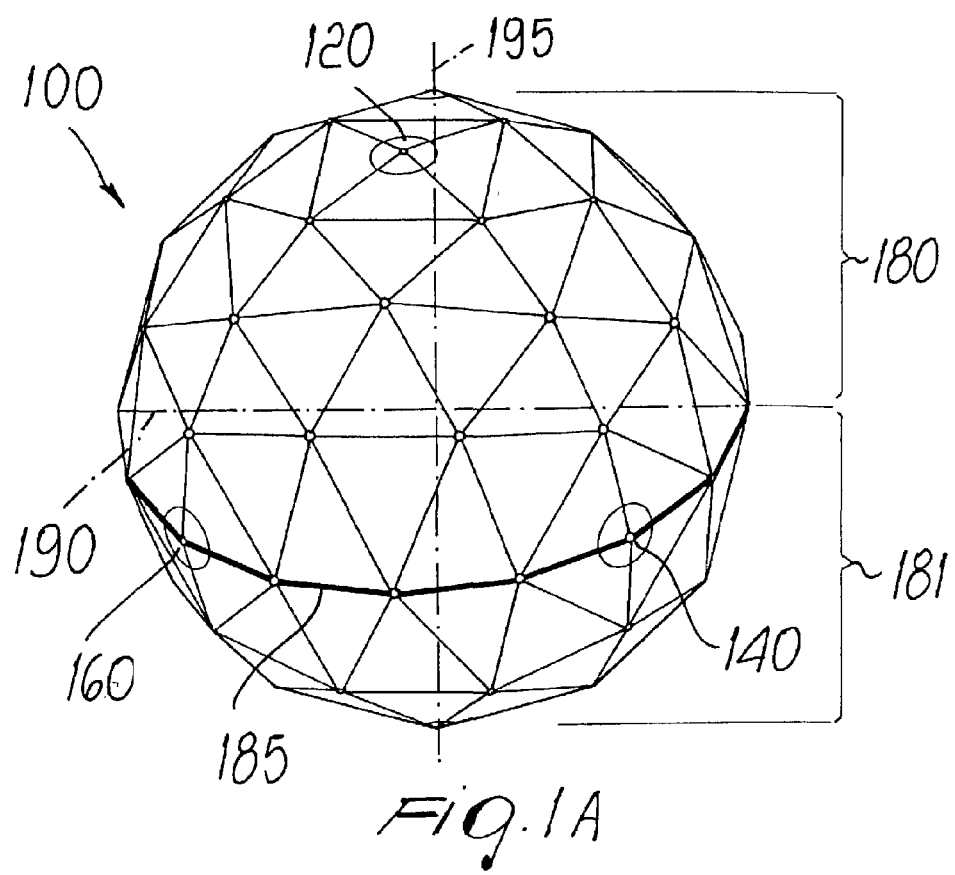
FIGS. 1a and 1b are perspective views of a preferred embodiment of the visualization device according to the invention.
Figure 1B:
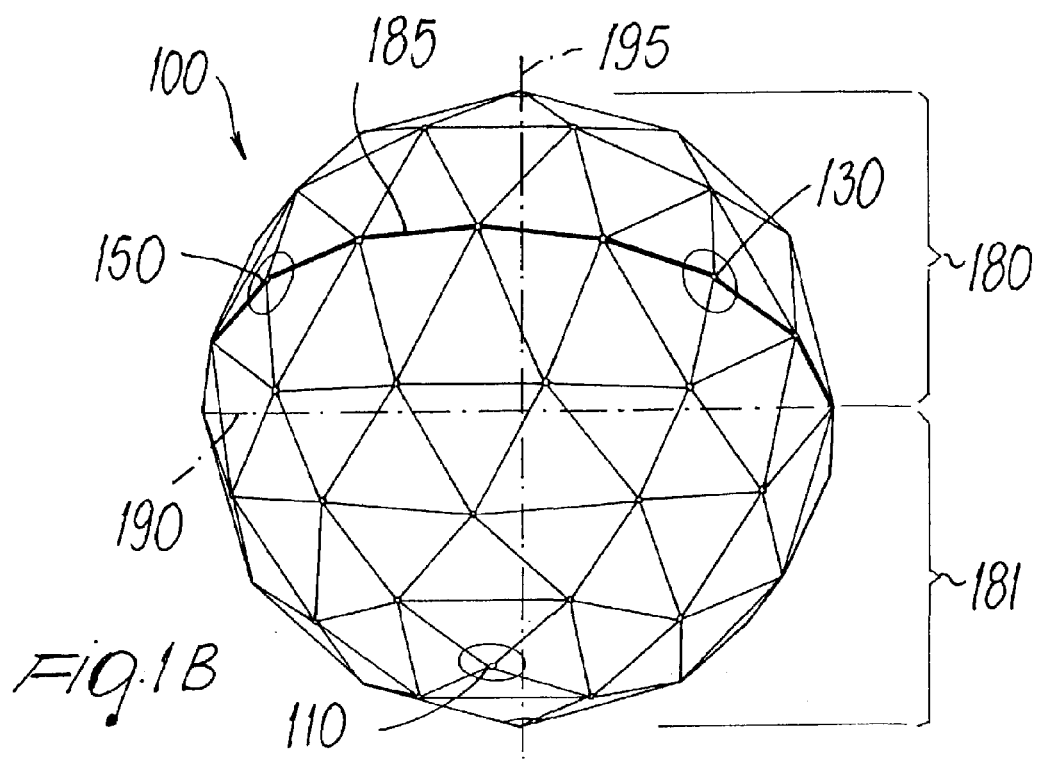

In a preferred embodiment of the visualization device according to the invention, shown in FIG. 1, primary parameters are selected which are defined by six "universal traits", chosen as three pairs of opposites and arranged on six poles 110, 120, 130, 140, 150, 160, of a primary geometric shape, in particular a regular polyhedron 100. The choice of the universal traits that belong to the preferred embodiment is based on an interlinguistic search conducted on the ethnic meanings of terms which are common to the widest number of languages of the Latin group, and is constituted by the following three pairs:

Passionate 120-Reflective 110;
Seductive 150-Basic 160;
Affective 130-Dynamic 140.

Each one of the universal traits constitutes a primary emotional representation of some of the characteristics that are present in the cataloged information, i.e., the data of an archive 450. Very often, however, the information cannot be associated with a single universal trait, and likewise the person conducting a search needs a broader modularity which allows to qualify and target his search activity on types of information having characteristics which can be ascribed to nuances of some universal traits. The method and the device according to the present invention allow to link each universal trait with all the others, except for its opposite (due to obvious incompatibility). The universal traits and the nuances between one and the other are well represented by a regular polyhedron chosen as a preferred embodiment of the visualization device, in which each universal trait is located on a different pole, where two opposite universal traits are arranged at the opposite poles. In particular, the preferred embodiment provides a regular polyhedron 100 with sixty-six vertices, each of which corresponds to a possible location of the information that is cataloged or sought. Of these sixty-six vertices, six correspond to said universal traits, while the other sixty are interpolations between two, three or more universal traits. This type of structure causes the storage and use of such a large number of parameters to occur in an analogical manner and is thus manageable intuitively and mnemonically.

In particular with reference to FIG. 1, the poles Passionate 120 and Reflective 110 are more important than the other poles and are arranged, according to the planetary metaphor, at the North Pole and South Pole, thus characterizing the emotional hemisphere 180 and the rational hemisphere 181 of the visualization polyhedron 100. The remaining four universal traits are instead arranged equidistantly from each other on the equator 185. In order to keep the Affective and Seductive traits always in the emotional hemisphere 180 and the Dynamic and Basic traits always in the rational hemisphere 181, the main axis of the visualization polyhedron 100 is appropriately inclined, determining an ecliptic plane 190 which crosses the equator 185 twice, thus dividing the solid into two hemispheres 180-181. The rotation of the visualization polyhedron 100 occurs about the axis of the ecliptic 195.

The nuances between two of the six main poles 110, 120, 130, 140, 150, 160 are organized by means of divisions into two identical parts of the space between one universal trait and the other, traced on the surface of the polyhedron 100. For example, the Passionate Basic trait is located at 45° latitude on the meridian defined by the two poles Passionate 120 and Basic 160.

By moving along the same meridian toward the Passionate pole 120, one reaches the vertex that defines the Passionate-Passionate Basic trait.

The nuances among three of the six poles 110, 120, 130, 140, 150, 160 of the preferred embodiment is performed on the eight quadrants of the polyhedron 100. On each one of said quadrants there are three vertices, and each one of said vertices defines a position which affects the three traits that lie on that given quadrant. The dominant trait is the one that is closest to one of the six poles 110, 120, 130, 140, 150, 160, while the other two have a smaller weight than the first one and are mutually equal. Owing to the regularity of the polyhedron 100, each one of the points located within a quadrant is halfway between one of the six poles 110, 120, 130, 140, 150, 160 and a trait which is intermediate between the other two that lie on that quadrant. Thus, for example, the vertex that identifies the Passionate-Basic Dynamic position lies on the line that connects the Passionate pole 120 and the intermediate point between the Basic pole 160 and the Dynamic pole 140.

The number of poles and the number of vertices of the polyhedron 100 can of course be varied at will if it is necessary to apply a more or less detailed cataloging or search, for example in relation to particular types of archive 450.

For instance, in a second preferred embodiment of the present invention, twenty secondary parameters are used in addition to the above mentioned six primary parameters, as shown in Table 1, wherein P=Passionate; B=Basic; S=Seductive; A=Affective; D=Dynamic; R=Reflective.

TABLE 1

| PB | PD | PS | PA |
|---|---|---|---|
| Proud | Audacious | Fascinating | Enthralling |
| Rough | Ardent | Voluptuous | Sentimental |
| Spartan | Impetuous | Luxurious | Moving |
| P-BD | P-DS | P-SA | P-AB |
| Energetic | Provocative | Sensual | Genuine |
| Vigorous | Exciting | Satisfying | Spontaneous |
| Sturdy | Stimulating | Tempting | Authentic |
| BD | DS | SA | AB |
| Concrete | Brilliant | Loveable | Sympathetic |
| Confident | Attractive | Sensitive | Dependable |
| Practical | Winning | Pleasant | Comforting |
| R-BD | R-DS | R-SA | R-AB |
| Explicit | Charismatic | Classical | Well-balanced |
| Participant | Magnetic | Refined | Reassuring |
| Versatile | Original | Esteemed | Measured |
| RB | RD | RS | RA |
| Simple | Resolute | Suggestive | Sweet |
| Sober | Persevering | Intriguing | Intimate |
| Essential | Firm | Evocative | Delicate |

Figure 2:
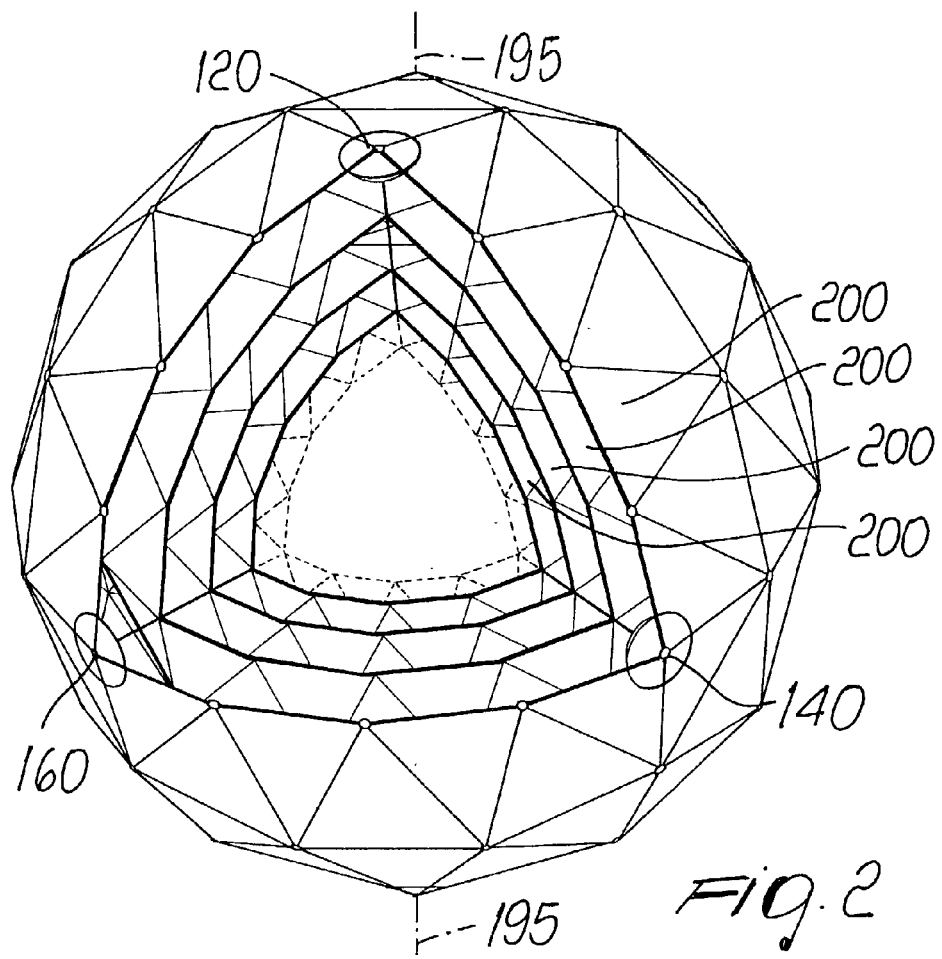
FIG. 2 is a perspective view of the layered structure of the visualization device of FIG. 1.

With reference now to FIG. 2, the architecture of the visualization polyhedron 100 is characterized by a structure with thematic layers 200 which are originated by expansion from an imaginary nucleus placed at infinity.

Each thematic layer 200 constitutes the medium of a thematic set, for example of images or subjects of the same nature which are distributed on its surface by means of appropriate placements. These placements can be constituted by various categories of the conceptual, pictorial, commercial type and so forth, each of which constitutes a cataloging class 451. The choice and construction of the thematic layers 200 can follow different logic systems for the various fields of application of the present invention. A significant operation capable of enriching the information that can be retrieved by means of the diagram is the coring of the polyhedron 100 in order to extract from different thematic layers 200 images with different pictorial natures but identical emotional natures. Coring constitutes one way to verify the consistency of an entire "emotional background" organized through various levels of in-depth analysis.

Figure 3:
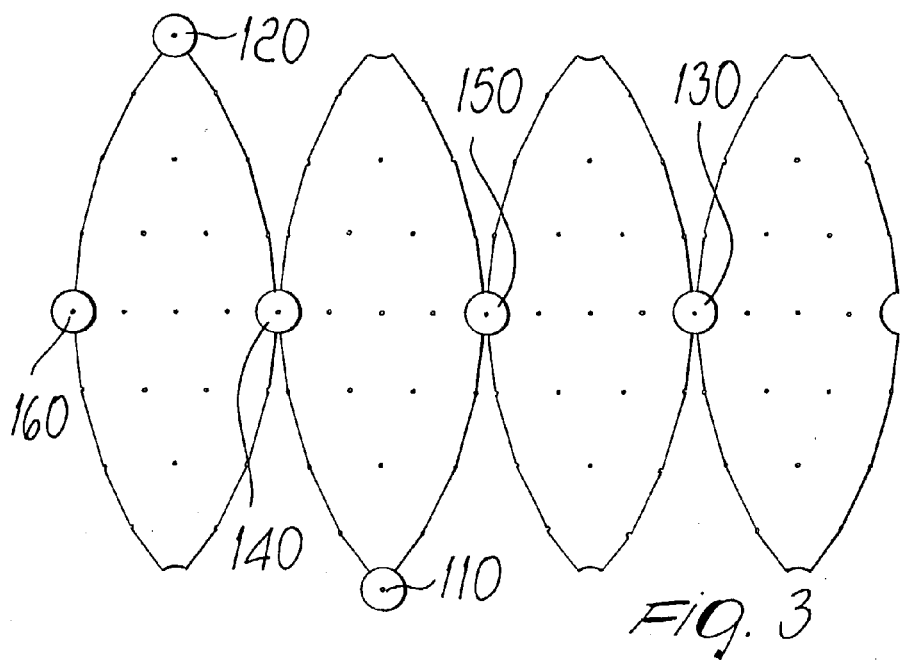
FIG. 3 is a planisphere view of the visualization device in a first preferred embodiment.

FIG. 3 illustrates a different implementation of the visualization device 100, provided by means of a planisphere view 300. Such view can be used mainly as an overview summarizing the type of data contained in a given archive 450, at one or more thematic layers 200, so as to immediately visualize particular concentrations of data in specific cataloging classes 440.

Figure 6:
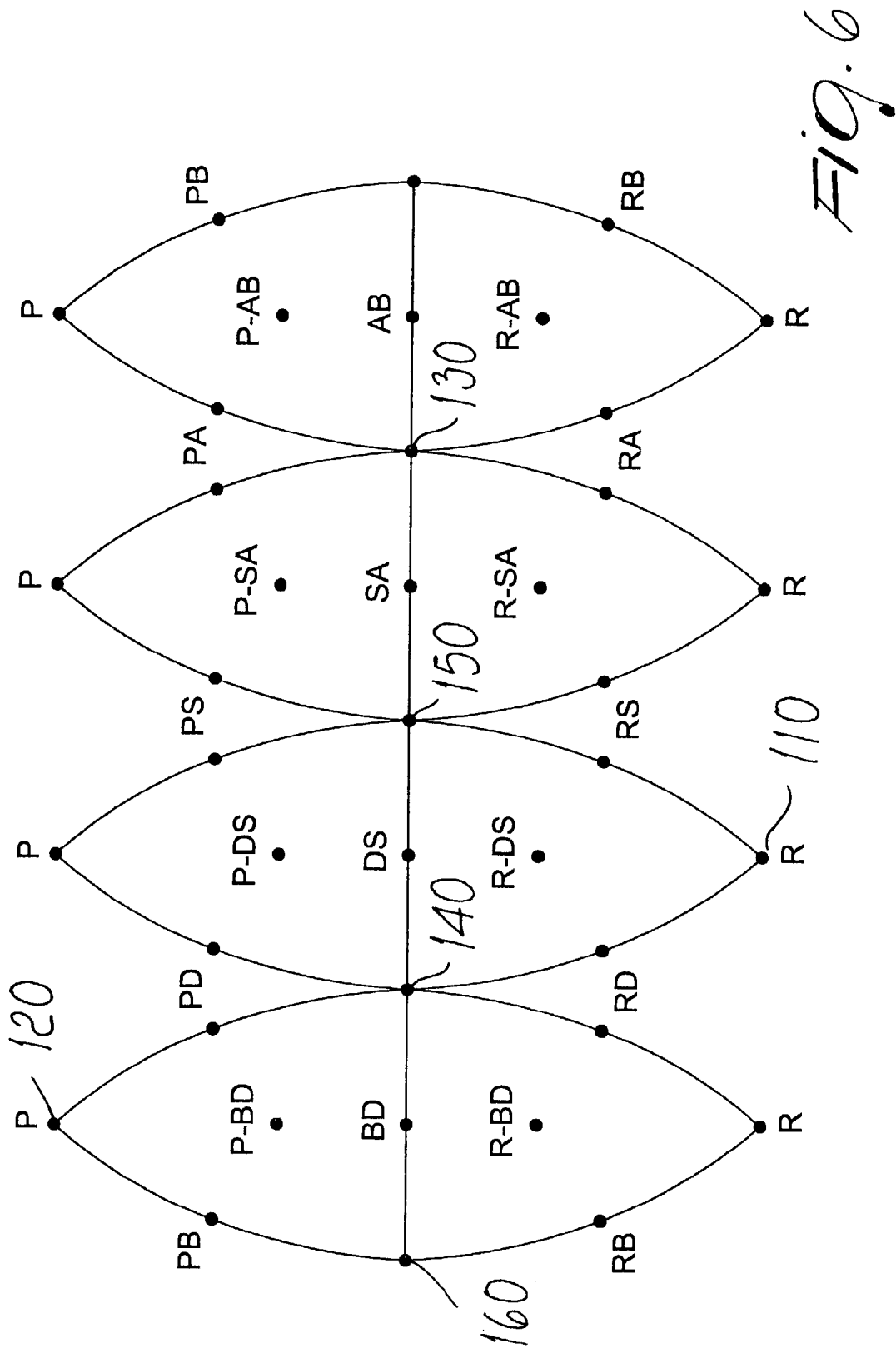
FIG. 6 is a planisphere view of the visualization device in a second preferred embodiment.

The same representation is provided in FIG. 6 with regard to the classification given in table 1.

Figure 4:
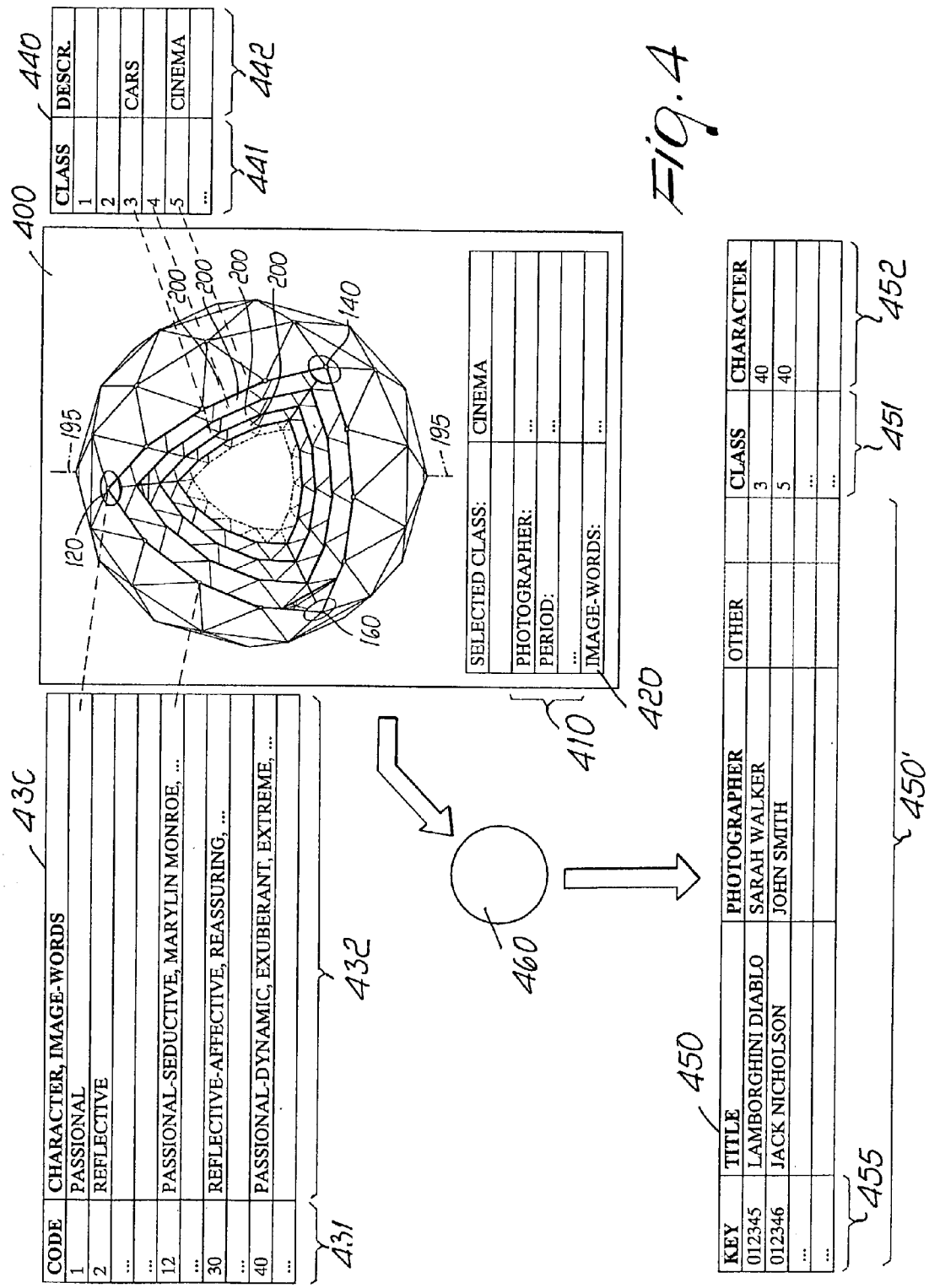
FIG. 4 is a schematic diagram of the association between the emotional information that can be obtained from the visualization device and concrete attributes translated in the data archive.

FIG. 4 schematically shows the association of the cataloging and/or search parameters with the data of the data archive 450. Operation is as follows:

a user uses a search tool 400, which comprises a visualization device, for example the polyhedron 100, in order to select a point thereon that clearly defines the mental idea that he has conceived. By way of appropriate association means, the point selected on the polyhedron 100 is associated with a given cataloging parameter, converted in the data archive 450 into one or more corresponding parameters 452, for example a number, or a pair of numbers in the form of spherical coordinates, or by using any point-to-point one-to-one correspondence algorithm. Together with the chosen emotional trait, the user can select a layer 200 of the visualization polyhedron 100, in order to limit the search to one or more types of stored information, whose division into classes is stored in the table 440. Moreover, the user can still enter additional search information 410 in a conventional manner, for example by means of masks, which allow him to confine the search to given data that are present in the archive 450, for example by entering the name of the photographer who took a certain slide, the brand of a car, the nationality of an actor, and so forth. The search information thus generated is thus encoded and transferred to the search engine 460 of the data archive 450, which scans the content and returns the requested information.

In addition to the type of interface described above, another preferred embodiment provides means for associating with each one of the vertices of the visualization polyhedron 100 a certain number of words which evoke given characteristics; said words can be constituted by adjectives and by symbolic elements and are generically defined as "image-words". For example, when working in the layer related to actors, the user might enter "Marilyn Monroe" as image-word 420, and this would identify a vertex of the visualization polyhedron 100 in the Passionate-Seductive area, or an image word such as "Reassuring", which might identify a vertex in the "Reflective-Affective" area.

Once the parameter 431 that corresponds to the sought image word has been identified, the operation for finding the information is similar to what has been described above. Finally, the user can enter a plurality of image words 420 for his search. The search engine 460 analyzes the entered image words in order to identify the parameter 431, 452 that best interpolates the entered data 420.

Again with reference to FIG. 4, the above-described operation can be applied in a similar manner not only to a user for searching for data but also to the operator of the archive for cataloging the data contained therein.

In particular, the method and the device for cataloging and searching for information according to the present invention are well-suited for acting as a filter even on existing archives: a generic archive can in fact be easily expanded with the addition of the information required to perform a cataloging according to the invention. For example, with reference to FIG. 4, the archive 450 can be seen as the expansion, obtained by way of the addition of the cataloging fields 451–452, of an original archive 450' in which only conventional information was present.

Figure 5:
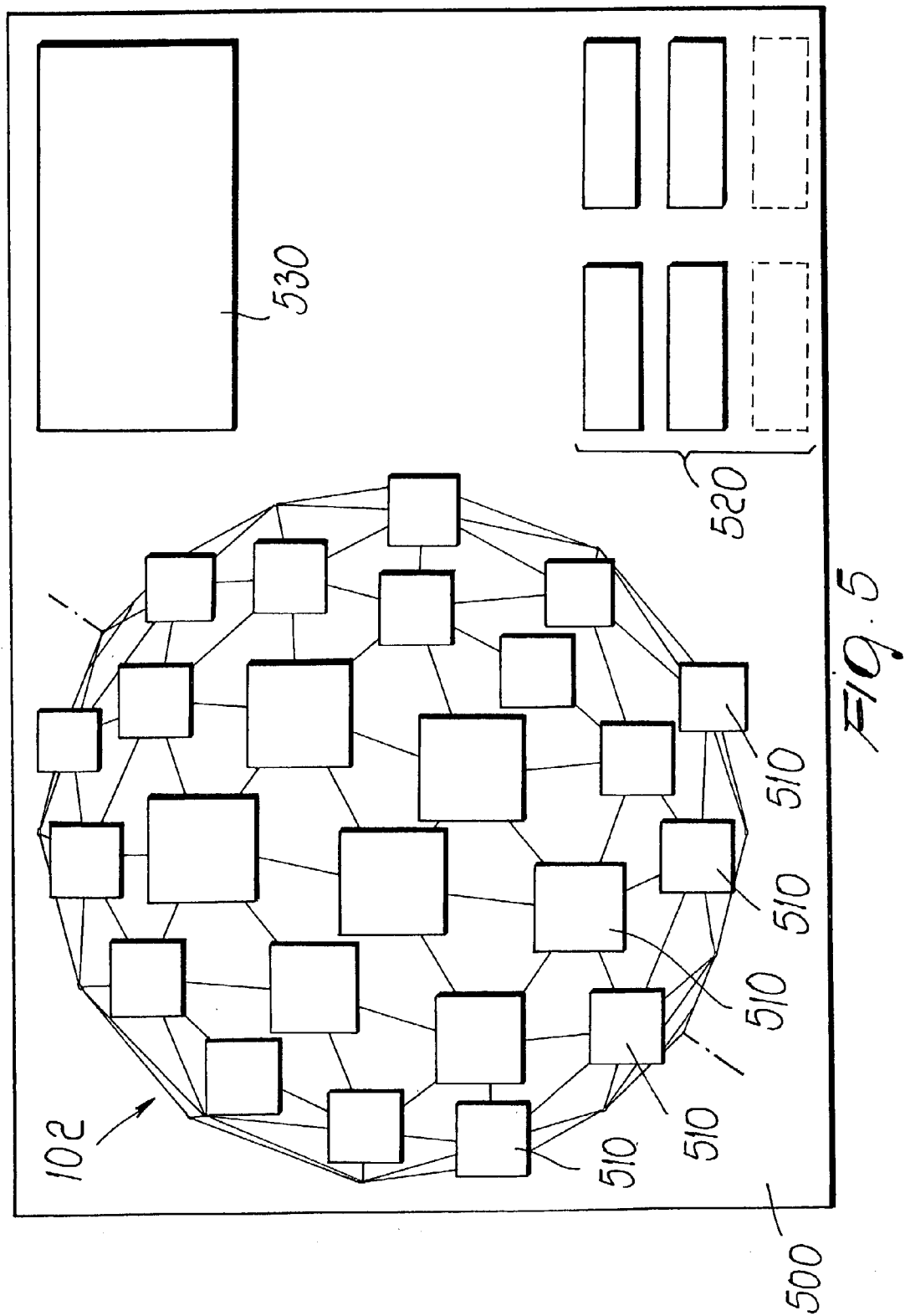
FIG. 5 is a view of a graphical interface which corresponds to an implementation of the preferred embodiment of the visualization device.

Finally, FIG. 5 illustrates a preferred embodiment of the visualization interface 500, which comprises a perspective view of the visualization device 102, which shows, at each visible vertex, an image 510. The image 510 can be either a paradigmatic image, i.e., a symbolic image which visually expresses the emotional identity expressed by the corresponding vertex of the visualization device 100, or one of the images contained in the data archive that corresponds to the selected search parameters. The same image, if selected for example by means of a pointing device, is visualized in a larger format in the frame 530. Finally, by way of the video means 520 it is possible to define the most appropriate operations to be performed on the display 102, such as for example turning the polyhedron in order to visualize hidden paradigmatic images, bring to the foreground a different layer 200, or visualize the next of the various images that belong to a given vertex, and it is also possible to add elements to the graphical interface in order to allow to enter search parameters or visualize the result of a search.

Obviously, the description of the above-described preferred embodiments is given only by way of non-limitative example. The invention thus conceived is susceptible of numerous modifications and variations which can be clearly deduced by the skilled in the field and all of which are within the scope of the protection of the inventive concept.

The disclosures in Italian Patent Application No. MI2000A000098 from which this application claims priority are incorporated herein by reference.

The invention claimed is:

1. A method for generating a visualization structure in the shape of a physical object for displaying, cataloging and searching data, comprising the steps of:

providing a device having a data archive;

providing data in the data archive;

defining, by the device, the data as at least one cataloging parameter wherein each of the at least one cataloging parameters comprises at least one emotional identity;

associating, by the device, one or more of the at least one cataloging parameters with the data; and controlling, by the device, the visualization of the data by generating a visualization structure in the shape of a polyhedron comprising the data in a visual, non-textual display that is a graphic representation relative to the at least one emotional identity of the at least one cataloging parameter associated with the data, wherein the data comprises at least one image of a non-textual object;

wherein at least one of the cataloging parameters comprises an even number of primary parameters and a number of secondary parameters generated by interpolation from said primary parameters, wherein the primary parameters include at least one pair of opposite traits; and wherein each one of said primary parameters of each one of said pairs of opposite traits is placed on said polyhedron in a fundamental position termed pole which is geometrically opposite to said corresponding opposite primary trait.

2. The method according to claim 1, wherein said number of primary parameters is equal to 6.

3. The method according to claim 2, wherein said six primary parameters are defined by three pairs of opposite traits labeled:
"Passionate", "Reflective";
"Seductive", Basic";
"Affective", "Dynamic".

4. The method according to claim 1, wherein said number of secondary parameters is equal to twenty or sixty.

5. The method according to claim 1, wherein the polyhedron has twenty-six or sixty-six vertices.

6. The method according to claim 5, wherein said polyhedron rotates about a rotation axis.

7. The method according to claim 6, wherein said polyhedron comprises a plurality of superimposed thematic layers, each layer being identified with a different cataloging class.

8. A device for the visual display, cataloging and searching of data, comprising:
a device having a finite amount of data in a data storage archive;
the data defined byte device as at least one cataloging parameter, each cataloging parameter comprising at least one of an emotional identity, and each cataloging parameter associated with the data; and
a visualization structure included in the device to control the visual representation of the data, the visualization structure in the shape of a polyhedron comprising the data in an emblematic, non-textual, visual display that is a graphic representation of the data relative to the at least one emotional identity of at least one cataloging parameter associated with the data wherein the data comprises at least one image of a non-textual object;
wherein the at least one cataloging parameters are defined by an even number of primary parameters and a number of secondary parameters generated by interpolation from said primary parameters, wherein the primary parameters include at least one pair of opposite traits; and
wherein each one of said primary parameters of each one of said pairs of opposite traits is placed on said polyhedron in a fundamental position termed pole which is geometrically opposite to said corresponding opposite primary trait.

9. The device according to claim 8, wherein said even, number of primary parameters is equal to six.

10. The device according to claim 9, wherein said six primary parameters are defined by three pairs of opposite fruits, labeled:
"Passionate","Reflective";
"Seductive", Basic";
"Affective", "Dynamic".

11. The device according to claim 8, wherein said number of secondary parameters is equal to twenty or sixty.

12. The device according to claim 8, wherein said visualization device is a polyhedron with twenty-six or sixty-six vertices.

13. The device according to claim 12, wherein said polyhedron comprises at least one rotation axis.

14. The device according to claim 13, wherein said polyhedron comprises a plurality of superimposed thematic layers each layer being identified with a different cataloging class.

* * * * *